(12) United States Patent
Olofsson et al.

(10) Patent No.: US 10,516,501 B2
(45) Date of Patent: Dec. 24, 2019

(54) NETWORK NODE, USER DEVICE AND METHODS THEREOF

(71) Applicant: HUAWEI TECHNOLOGIES CO., LTD., Shenzhen (CN)

(72) Inventors: Henrik Olofsson, Kista (SE); Petteri Kela, Helsinki (FI)

(73) Assignee: Huawei Technologies Co., Ltd., Shenzhen (CN)

( * ) Notice: Subject to any disclaimer, the term of this patent is extended or adjusted under 35 U.S.C. 154(b) by 6 days.

(21) Appl. No.: 15/861,887

(22) Filed: Jan. 4, 2018

(65) Prior Publication Data
US 2018/0131464 A1 May 10, 2018

Related U.S. Application Data

(63) Continuation of application No. PCT/EP2015/065543, filed on Jul. 8, 2015.

(51) Int. Cl.
*H04L 1/00* (2006.01)
*H04B 17/309* (2015.01)
*H04L 5/00* (2006.01)

(52) U.S. Cl.
CPC ......... *H04L 1/0004* (2013.01); *H04B 17/309* (2015.01); *H04L 1/0023* (2013.01); *H04L 1/0013* (2013.01); *H04L 5/0057* (2013.01)

(58) Field of Classification Search
None
See application file for complete search history.

(56) References Cited

U.S. PATENT DOCUMENTS

| 9,660,881 | B2 * | 5/2017 | Chaudhuri | H04L 43/06 |
| 10,003,513 | B2 * | 6/2018 | Yu | H04B 17/309 |
| 2005/0094588 | A1 * | 5/2005 | Wentink | H04W 40/10 |
| | | | | 370/315 |

(Continued)

FOREIGN PATENT DOCUMENTS

WO    WO-2014172865 A1 * 10/2014    .......... H04W 52/146

OTHER PUBLICATIONS

International Search Report and Written Opinion issued in corresponding International Application No. PCT/EP2015/065543, dated Mar. 31, 2016, 10 pages.

*Primary Examiner* — Phirin Sam
*Assistant Examiner* — Tarell A Hampton
(74) *Attorney, Agent, or Firm* — Leydig, Voit & Mayer, Ltd.

(57) ABSTRACT

The present disclosure relates to a device, and a method and a network node for a wireless communication system. The device includes: a transceiver and a processor, and the transceiver is configured to receive a first control signal from a network node where the first control signal includes a measurement request for a first reference signal, and receive the first reference signal from the network node, the processor is configured to measure the first reference signal according to the measurement request, and the transceiver is further configured to transmit a second control signal to the network node where the second control signal includes a measurement report indicating the measurement of the first reference signal, and transmit a second reference signal to the network node where the measurement report indicates a transmitted power of the second reference signal.

18 Claims, 11 Drawing Sheets

(56) References Cited

U.S. PATENT DOCUMENTS

| | | | |
|---|---|---|---|
| 2010/0098051 A1* | 4/2010 | Uemura | H04W 56/0015 370/350 |
| 2011/0243008 A1* | 10/2011 | Kim | H04L 1/1893 370/252 |
| 2013/0088995 A1* | 4/2013 | Chun | H04B 7/0626 370/252 |
| 2014/0119318 A1* | 5/2014 | Zhu | H04W 72/1284 370/329 |
| 2015/0072690 A1* | 3/2015 | Kim | H04W 52/146 455/437 |
| 2015/0110068 A1* | 4/2015 | Yang | H04W 36/0061 370/331 |
| 2015/0141027 A1* | 5/2015 | Tsui | H04W 52/243 455/452.1 |
| 2016/0044611 A1* | 2/2016 | Dai | H04W 52/146 370/329 |

* cited by examiner

NETWORK NODE, USER DEVICE AND METHODS THEREOF

CROSS-REFERENCE TO RELATED APPLICATIONS

This application is a continuation of International Application No. PCT/EP2015/065543, filed on Jul. 8, 2015, the entire content of which is hereby incorporated by reference in its entirety.

TECHNICAL FIELD

The present disclosure relates to a network node, a device and a method for wireless communication system.

BACKGROUND

In order to enhance the capacity of a wireless communication system where different connections have different qualities, the wireless communication system may select different Modulation and Coding Schemes (MCS) for different connections. Usually, the better the quality, the more information bits can be transmitted, i.e. higher modulation and less channel coding. This method is especially beneficial if there is knowledge about the quality of the connection prior to transmission.

SUMMARY

The present disclosure discloses a method, a device and a network node for a wireless communication system.

In a first aspect of the present disclosure, a network node for a wireless communication system is provided. The network node may include a transceiver, and a processor, where the transceiver may be configured to transmit a first control signal to a user device where the first control signal may include a measurement request for at least one first reference signal, transmit the first reference signal to the user device, receive a second control signal from the user device where the second control signal may include a measurement report indicating a measurement of the first reference signal at the user device, and receive a second reference signal from the user device; and the processor may be configured to measure a received power of the second reference signal, calculate at least one gain between the network node and the user device based on the measurement of the first reference signal and the received power of the second reference signal.

In a second aspect of the present disclosure, a device for a wireless communication system is provided. The device may include a transceiver, and a processor, where the transceiver may be configured to receive a first control signal from a network node where the first control signal may include a measurement request for a first reference signal, receive the first reference signal from the network node; the processor may be configured to measure the first reference signal according to the measurement request; and the transceiver may be further configured to transmit a second control signal to the network node, the second control signal comprising a measurement report indicating the measurement of the first reference signal, transmit a second reference signal to the network node where the measurement report indicates a transmitted power of the second reference signal.

In a third aspect of the present disclosure, a method for a wireless communication system is provided. The method may include transmitting a first control signal to a user device where the first control signal may include a measurement request for at least one first reference signal, transmitting the first reference signal to the user device, receiving a second control signal from the user device, the second control signal comprising a measurement report indicating a measurement of the first reference signal at the user device, receiving a second reference signal from the user device, measuring a received power of the second reference signal, calculating at least one gain between the network node and the user device based on the measurement of the first reference signal and the received power of the second reference signal.

It should be understood that both the foregoing general description and the following detailed descriptions are only exemplary and explanatory and are not restrictive of the disclosure.

BRIEF DESCRIPTION OF THE DRAWINGS

The appended drawings are intended to clarify and explain different examples of the present disclosure, in which.

DETAILED DESCRIPTION

Figure 1:
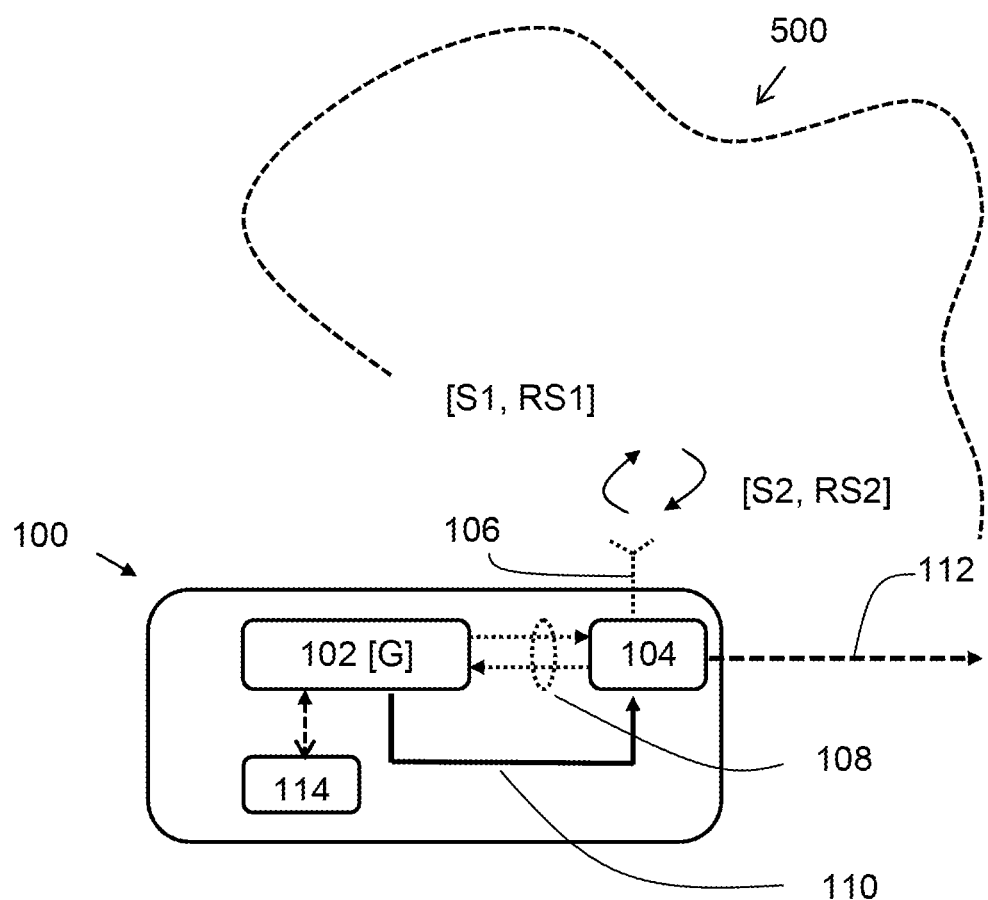
FIG. 1 shows a network node according to an example of the present disclosure.

In some systems, such as Long Term Evolution (LTE), this is solved by the User Equipment (UE) measuring the Downlink (DL) reference symbols. The UE then replies with a quality index which maps to a MCS. A similar method is also possible to use in the Uplink (UL), where the UE may transmit a reference signal to the eNodeB who could map this to an MCS and send the MCS to the UE to be used in the UL.

Another option is to let the UE report the actual channel quality, and based on this information the eNodeB can perform the MCS selection. The benefit of the previous alternative is however that depending on receiver implementation, different UE can have different sensitivity and can therefore support different MCS at the same channel condition.

In addition to the above, the eNodeB may also apply an Outer Loop Link Adaptation (OLLA). This is performed by tuning the Signal to Interference and Noise Ratio (SINR) threshold(s) which is used for MCS selection. For example, if a Negative Acknowledgment (NACK) is received, then SINR thresholds(s) can be adjusted to select an MCS with less information bits and if Acknowledgment (ACK) is received, then SINR threshold(s) can be adjusted to select an MCS with more information bits. This can be used in both the UL and DL.

In future systems (such as 5G) one possible solution is to use Time Division Duplex (TDD), i.e. where the UL and DL are transmitted in the same frequency but where the UL and DL channel are separated in time. In such future system, it is possible to use estimation of the channel state for one direction also for transmissions in the other direction due to channel reciprocity. This would be beneficial since this reduce the need to feedback the measurement results, and may also reduce the need to send the reference signal in both directions.

Additionally in 5G Multi-User Multiple Input Multiple Output (MU-MIMO) and Coordinated Multi-Point (CoMP) systems operating above LTE frequencies, up-to-date channel state estimation is crucial for MCS selection due to the short coherence time of the channel. Hence, traditional reporting mechanisms, which require measurement in one network node, and reporting to the other network node where it will be used generates a too large delay for the channel state estimation to get beam forming and especially MCS selection to work efficiently. Furthermore, due to dynamic scheduling and beam forming the channel state experienced by the UE will vary significantly every Transmission Timer Interval (TTI). This makes MCS selection even harder and obtaining up to date channel state estimation by utilizing channel reciprocity in TDD system will be indispensable.

One problem is that the absolute accuracy of the gain in the communication equipment is usually quite relaxed, e.g. +/−3 dB. This is not a problem in the legacy systems, since the transmission of data (using the selected MCS) is performed by the same network node that sends the reference signal, and hence the relative accuracy is more important. The requirements for relative accuracy are usually set stricter and are also usually easier to implement with this stricter requirement compared to the absolute gain. But in a wireless communication system where the reference signal is not transmitted by the same network node that sends the data, the absolute accuracy becomes important. One way to solve this is to impose stricter requirements, but this is very costly for manufacturing the communication equipment.

FIG. 1 shows a network node 100 according to an example of the present disclosure. The network node 100 comprises a processor 102 which is communicably coupled with communication means 108 to a transceiver 104. The communication means 108 are illustrated as dotted arrows between the processor 102 and the transceiver 104 in FIG. 1. The communication means 108 are according to techniques well known in the art. The communication means 108 may e.g. be used for transfer of data or signalling between the processor 102 and the transceiver 104. The network node 100 in this particular example further comprises control means 110 by which the processor 102 operates (or controls) the transceiver 104. The control means are illustrated with the arrow from the processor 102 to the transceiver 104. The network node 100 also comprises antenna means 106 coupled to the transceiver 104 for reception and transmission in the wireless communication system 500. The network node 100 may also have wired communication means 112 so that the network node 100 e.g. can communication with other network nodes or control nodes of the wireless communication system 500 over the wired communication means 112. The network node 100 may also optionally comprise a memory 114 communicably coupled (dashed line) with the processor 102.

Figure 3:
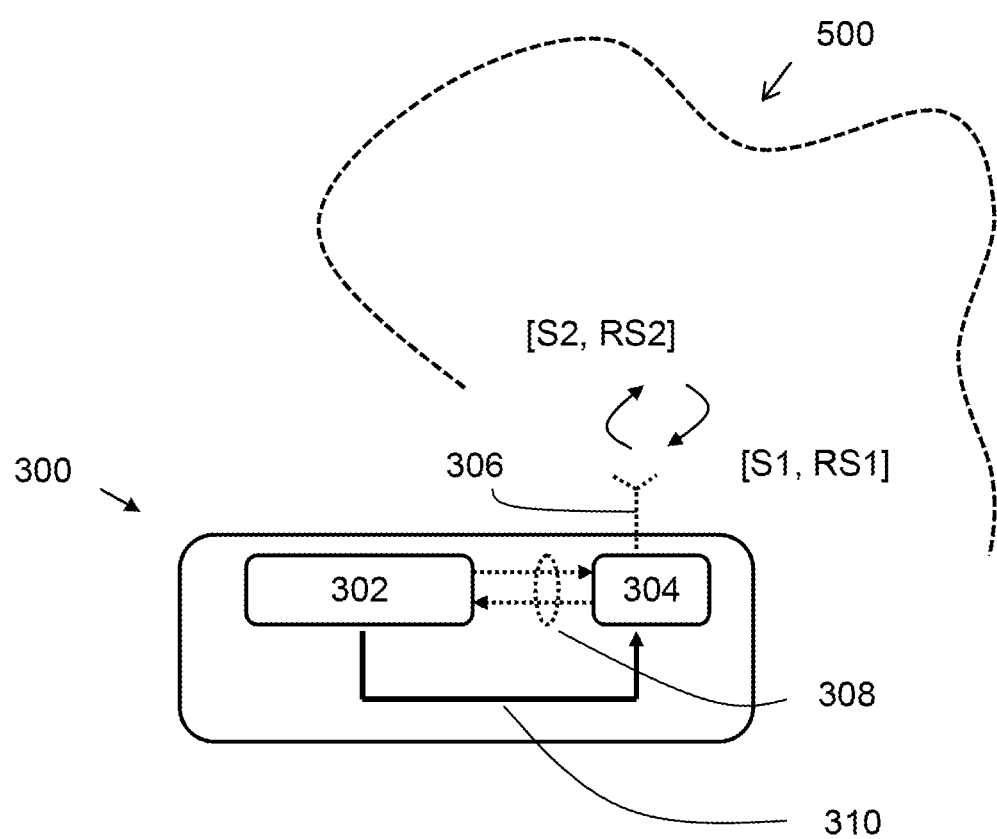
FIG. 3 shows a user device according to an example of the present disclosure.

According to the present solution, the transceiver 104 is configured to transmit a first control signal S1 to a user device 300 (see FIG. 3 for more information about the user device 300 which is not shown in FIG. 1). The first control signal S1 comprises a measurement request for at least one first reference signal RS1. The transceiver 104 is further configured to transmit the first reference signal RS1 to the user device 300. The transceiver 104 is further configured to receive a second control signal S2 from the user device 300, and the second control signal S2 comprises a measurement report indicating a received power of the first reference signal RS1 at the user device 300. The transceiver 104 is further configured to receive a second reference signal RS2 from the user device 300. The processor 102 is configured to measure a received power of the second reference signal RS2. The processor 102 is further configured to calculate at least one gain G between the network node 100 and the user device 300 based on the received power of the first reference signal RS1 and the received power of the second reference signal RS2. The reference signals RS1 and RS2 may e.g. be beacon signals.

Figure 2:
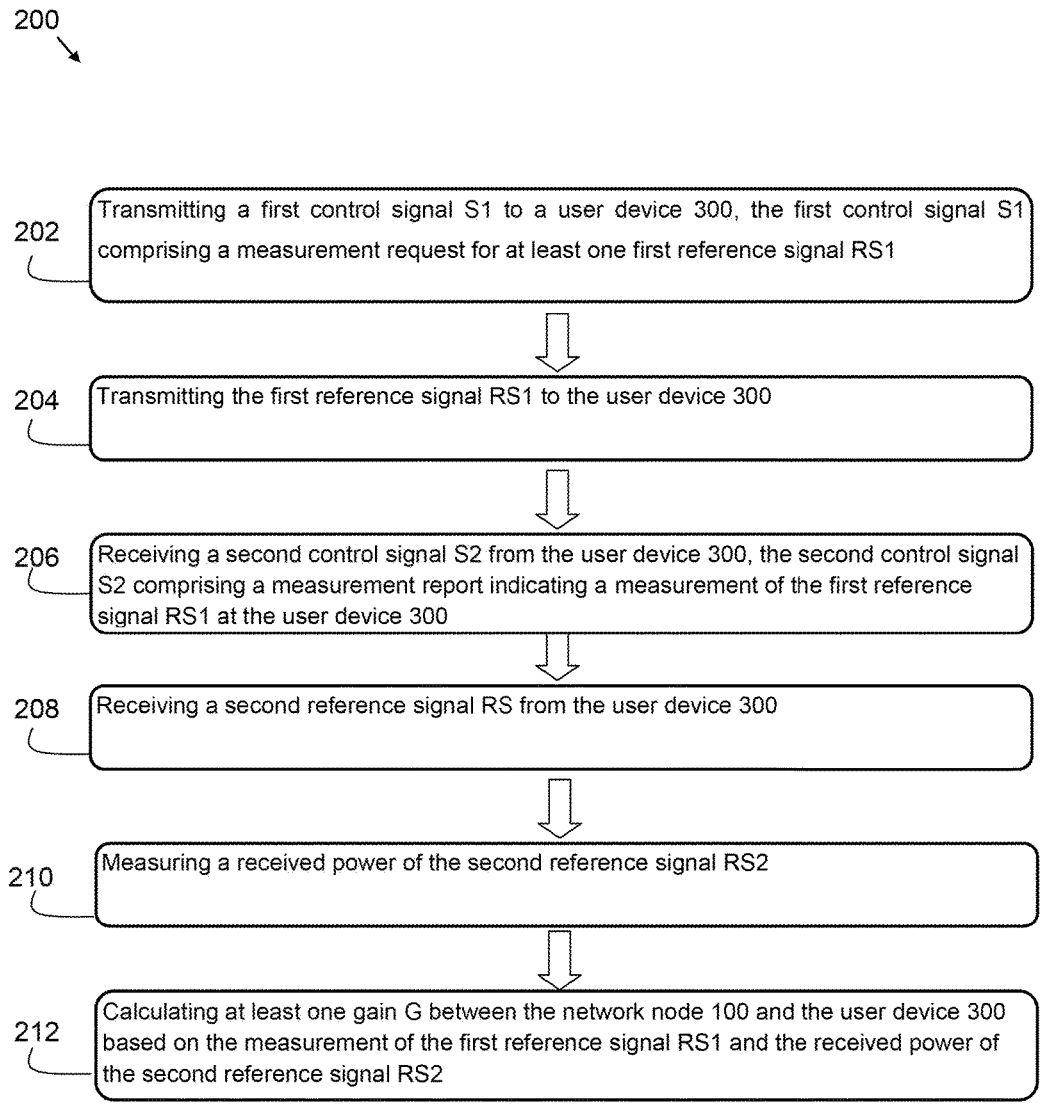
FIG. 2 shows a method according to an example of the present disclosure.

FIG. 2 shows a corresponding method 200. The method 200 may be executed in a network node 100, such as the one shown in FIG. 1. The method 200 comprises the step 202 of transmitting a first control signal S1 to a user device 300, wherein the first control signal S1 comprises a measurement request for at least one first reference signal RS1. The method 200 further comprises the step 204 of transmitting the first reference signal RS1 to the user device 300. The method 200 further comprises the step 206 of receiving a second control signal S2 from the user device 300, the second control signal S2 comprising a measurement report indicating a received power of the first reference signal RS1 at the user device 300. The method 200 further comprises the step 208 of receiving a second reference signal RS2 from the user device 300. The method 200 further comprises the step 210 of measuring a received power of the second reference signal RS2. The method 200 further comprises the step 212 of calculating at least one gain G between the network node 100 and the user device 300 based on the received power of the first reference signal RS1 and the received power of the second reference signal RS2. Note that the sequence in the example above may be re-ordered, for example in order to reduce the time between the two reference signals RS1 and RS2, step 208 may be performed before step 206.

FIG. 3 shows a user device 300 according to an example of the present disclosure. The user device 300 comprises a processor 302 which is communicably coupled with communication means 308 to a transceiver 304. The communication means 308 are illustrated as dotted arrows between the processor 302 and the transceiver 304 in FIG. 3. The communication means 308 are according to techniques well known in the art. The coupling means 308 may e.g. be used for transfer of data and/or signalling between the processor 302 and the transceiver 304. The user device 300 in this particular example further comprises control means 310 by which the processor 302 operates (or controls) the transceiver 304. The control means 310 are illustrated with the arrow from the processor 302 to the transceiver 304. The user device 300 also comprises antenna means 306 coupled to the transceiver 304 for reception and transmission in the wireless communication system 500.

According to the present solution, the transceiver 304 is configured to receive a first control signal S1 from a network node 100, the first control signal S1 comprising a measurement request for a first reference signal RS1. The transceiver 304 is further configured to receive the first reference signal RS1 from the network node 100. The processor 302 configured to measure a received power of the first reference signal RS1 according to the measurement request. The transceiver 304 further is configured to transmit a second control signal S2 to the network node 100, wherein the second control signal S2 comprises a measurement report indicating the received power of the first reference signal RS1. The transceiver 304 further is configured to transmit a second reference signal RS2 to the network node 100.

Figure 4:
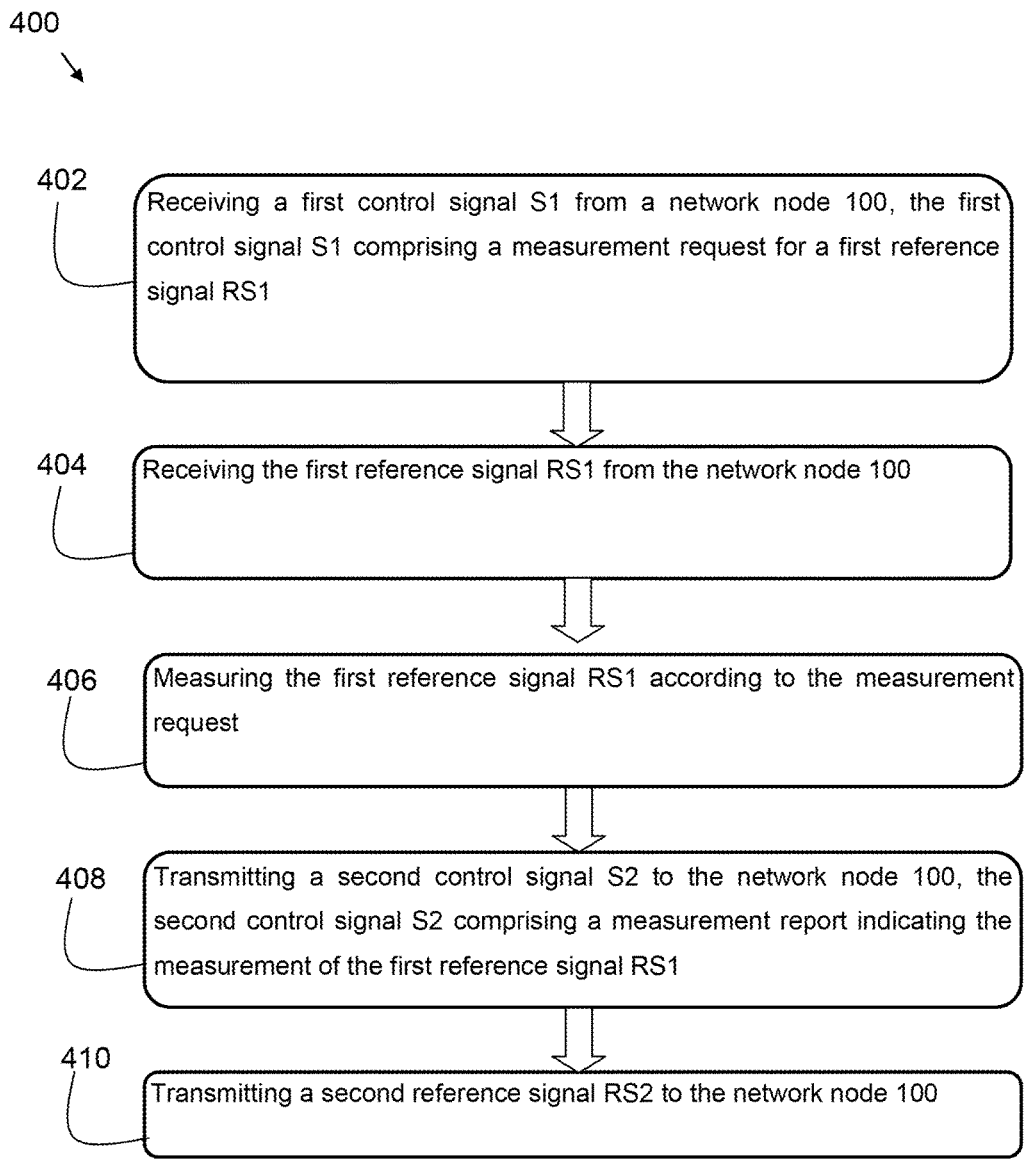
FIG. 4 shows a method according to an example of the present disclosure.

FIG. 4 shows a corresponding method 400. The method 400 may be executed in a user device 300, such as the one shown in FIG. 3. The method 400 comprises the step 402 of receiving a first control signal S1 from a network node 100, the first control signal S1 comprising a measurement request for a first reference signal RS1. The method further comprises the step 404 of receiving the first reference signal RS1 from the network node 100. The method further comprises the step 406 of measuring a received power of the first reference signal RS1 according to the measurement request. The method further comprise the step 408 of transmitting a second control signal S2 to the network node 100, the second control signal S2 comprising a measurement report indicating the received power of the first reference signal RS1. The method further comprises the step 410 of transmitting a second reference signal RS2 to the network node 100. Note that the sequence in the example above may be re-ordered, for example in order to reduce the time between the two reference signals RS1 and RS2, step 410 may be performed before step 408.

According to an example of the present disclosure, the calculated gain G is at least one of a gain from the network node 100 to the use device 300, i.e. DL gain, and a gain from the user device 300 to the network node 100, i.e. UL gain.

According to a further example of the present disclosure, the calculated gain G is a gain difference between a gain from the network node 100 to the use device 300 and a gain from the user device 300 to the network node 100, e.g. DL gain—UL gain or UL gain—DL gain.

In this disclosure term calculated gain and gain is used. Gain is a measure of the ability of a circuit to increase the power or amplitude of a signal from the input point to the output point. In this disclosure we also allow the use of negative gain, i.e. attenuation. We consider the gain as the difference between one input and one output point, where these points are considered to be in different parts of the path for the analogue signal in a wireless communication system, e.g. in the transmitter, receiver channel, or a gain reflecting combinations of these.

We also use the term relative and absolute accuracy of the gain. With absolute accuracy, we consider the accuracy of the gain, i.e. the accuracy of the difference between the signal power or amplitude between the input or output signal. With relative accuracy we consider the difference between the gain for two input signals, i.e. the difference in gain for two or more pairs of input and output signals.

According to an example of the present disclosure, the measurement request further indicates a transmitted power of the first reference signal RS1. Thereby, the user device may include this in the measurement report to enable a measurement of the gain in the receiving network node.

According to an example of the present disclosure, the measurement request further indicates resource allocation for the first reference signal RS1 or the second reference signal RS2. Thereby, the network node 100 may assign different resources for these reference signals to different user devices, e.g. depending on where the user device is located.

Figure 5:
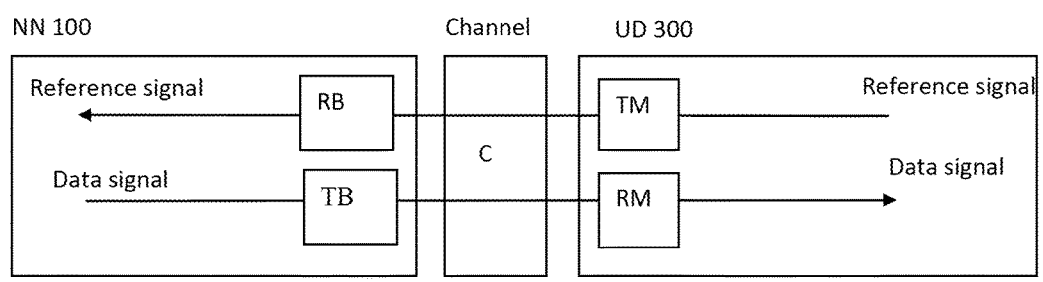
FIG. 5 illustrates gain(s) between a network node and a user device.

In a scenario where we use the reference signal transmitted in one direction by the network node to estimate the channel state and perform MCS selection for data sent in the other direction is shown in FIG. 5 where C denotes the gain of the channel. The different gain in the receiver and the transmitter in the network node and user device in the two directions impact the signal differently. As shown in FIG. 5, the reference signal is impacted by two absolute gains: the gain in the transmitter of the user device (TM) and the gain of the receiver of the network node (RB). The data signal is impacted by two different gains: the gain in the transmitter of the network node (TB) and the gain of the receiver of the user device (RM).

Utilizing channel reciprocity for obtaining the channel state estimation will be crucial for MU-MIMO and CoMP systems and MSC selection, but doing this in a system where the network node transmitting the data and the reference signal is not the same, may have some drawbacks. A mechanism to improve the MSC selection is needed. Two main issues need to be solved: reduce the impact of the relaxed absolute accuracy; and enable taking receiver sensitivity into account. When channel estimation delay increases, the achievable performance decreases significantly. Hence, the usage of channel reciprocity with TDD will be unavoidable in high order MU-MIMO and distributed CoMP systems.

One solution for estimating the actual gain is to compare the transmitted power with the measured received power for a signal. The radio channel is however fluctuating a lot and varies in time. The time variation of the channel is typically defined by the coherence time of the channel. If the channel state change too much, it will be difficult to determine which part of the gain is due to the changes in the channel state and which part is from the gain in the involved nodes. One solution is therefore to transmit something in both directions in close proximity in time and estimate the difference in gain between the two directions. With close proximity in time we mean in the order of the coherence time of the channel. Therefore according to an example of the present disclosure, the first reference signal RS1 and the second reference signal RS2 are transmitted in the same coherence time of the radio channel.

The difference of the present solution compared to conventional solutions, such as mobility measurements in Global Systems for Mobile Communications (GSM), Wideband Code Division Multiple Access (WCDMA) and LTE, is that according to the present solution not only a single DL measurement is requested, but requires a combination of coordinated UL and DL measurements. Therefore, the network node 100 has enough information to estimate the gain in both directions reasonable close in time (and with reasonably similar channel state).

FIGS. 6-11 show different examples according to the present disclosure.

Figure 6:
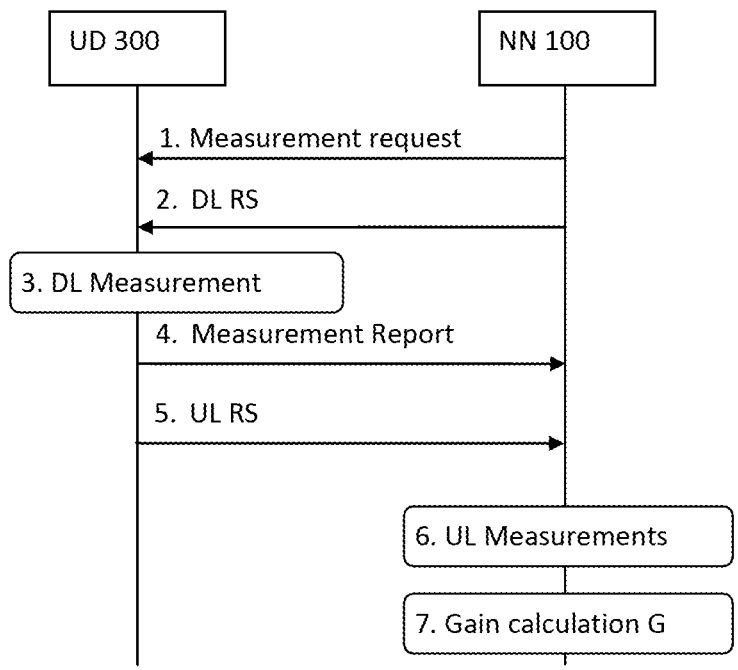
FIGS. 6-11 show further examples of the present disclosure.

FIG. 6 shows major signalling steps between network node 100 (NN) and user device 300 (UD) according to an example of the present disclosure. With reference to FIG. 6:

Measurement request: this is the request from the network node 100 to the user device 300 for initiating the gain measurement. The network node 100 includes the measurement request for the user device 300 to measure the DL RS and send an UL RS. Information about the UL RS and/or DL RS to be used may be included in this measurement request.

DL RS: the DL RS is transmitted. This may or may not be a dedicated RS for this user device 300. It may also be a RS used for other purposes or it may be the measurement request transmitted in the previous step. The RS may be a beacon signal.

DL measurements: the user device 300 measures the received power of the DL RS.

Measurement report: the user device 300 transmits the measurement report, including the received power of the DL reference power or the gain, calculated by dividing the received power by the transmitted power of the DL reference signal. This may also include the transmit power that is used for the UL RS.

UL RS: the UL RS is transmitted. This may or may not be a specific signal, a RS used for other purposes or the measurement report transmitted in the previous step.

UL measurements: The user device 300 measures the received power of the UL RS.

Gain calculation: the network node 100 compares the measurement result from the DL and UL measurements and compares these to calculate the gain G. One way to do this is to compare the transmitted power with the received power to get the gain in each direction and then compare these two gains.

Figure 7:
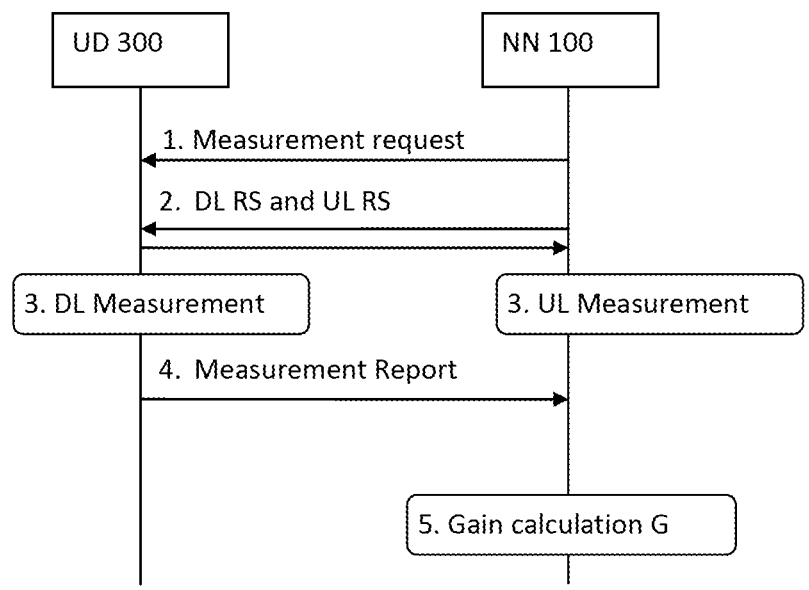

The order of the above steps may be changed depending on example. For example, as discussed before it may be desirable to locate the UL RS and DL RS as close as possible in time, in which case the two RSs may be transmitted in even closer proximity in time to each other. Note that the UL RS may also be transmitted before the DL RS. This is illustrated in FIG. 7 showing an example of the present disclosure. With reference to FIG. 7:

Measurement request: this is the request from the network node 100 to initiate the gain measurement. The network node 100 includes the request for the user device 300 to measure the DL RS and send an UL RS. Information about the UL RS and/or DL RS to be used may be included in this request.

DL RS and UL RS: the DL RS and UL RS are transmitted in close proximity in time. The DL RS may or may not be a dedicated RS for this user device 300. It may also be a RS used for other purposes.

UL and DL measurements: the user device 300 measures the received power of the DL RS and the network node 100 measures the received power of the UL RS.

Measurement report: the user device 300 transmits the measurement report, including the received power of the DL RS or the gain, calculated by dividing the received power by the transmitted power of the DL reference signal. This report may also include the transmit power that is used for the UL RS.

Gain calculation: in this step, the network node 100 uses the results from the measurements to calculate the difference in gain in UL and/or DL as described earlier.

Figure 8:
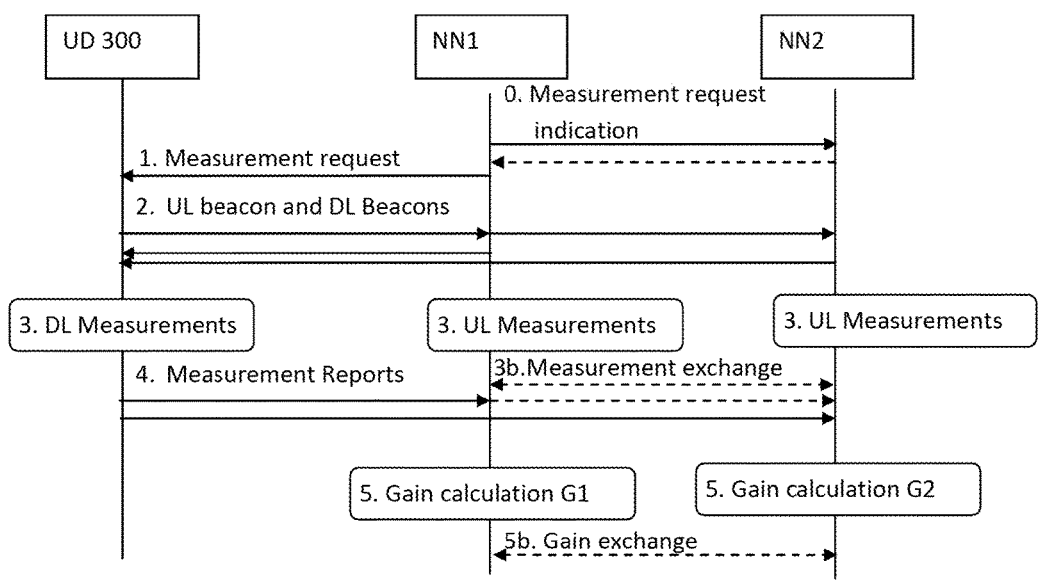
Figure 9:
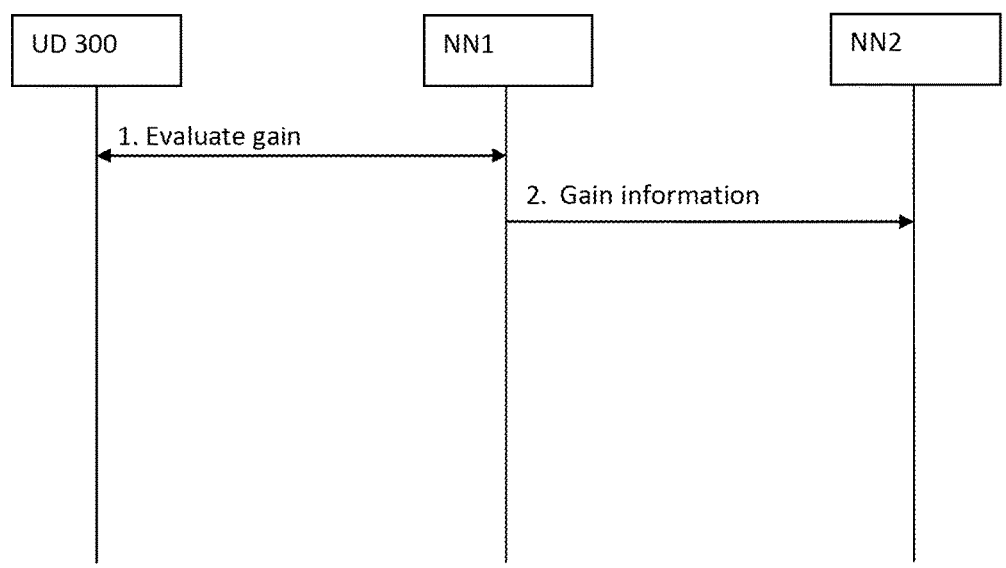

Another possible sequence would be to utilise the possibility for the UL transmission to be received by multiple network nodes of the wireless communication system 500. But in this case, it may be required that the UL RS is followed by a DL RS for all network nodes that can detect the UL RS in order to make sure the RSs are transmitted in close proximity in time. This is illustrated in FIG. 8 showing a further example of the present disclosure. With reference to FIG. 8:

Measurement request indication: in this step a network node NN1 optionally informs a neighbouring network node NN2 about the intention to perform a measurement towards a specific user device 300. The request indication may include information regarding when the measurement will occur and in which resources, e.g. frequency, time, code, etc. Network node NN2 may or may not respond with an acknowledgment whether it will participate in the measurement and may also include similar information on what resources that will be used.

Measurement request: this is the request from the network node NN1 to the user device 300 to initiate the gain measurement. The network node NN1 includes the request for the user device 300 to send an UL RS and measure the DL RS. Information about the UL and DL RS to be used may be included in the request. This request may also include information about other network nodes that will participate in the measurement and may also contain information about the UL RS and DL RS that will be used with the other network nodes.

UL RS and DL RS: the DL RS and UL RS are transmitted in close proximity in time. The DL RS may or may not be a dedicated RS for this user device 300. The DL RS from different network nodes may use the same or different resource. It may also be a RS used for other purposes.

UL and DL measurements: the user device 300 measures the received power of the DL RS and network node NN1 and possibly network node NN2 measure the received power of the UL RS. In an optional step 3b network nodes NN1 and NN2 exchange the measurement results with each other.

Measurement report: the user device 300 transmits the measurement report, including the received power of the DL reference power or the gain, calculated by dividing the received power by the transmitted power of the DL reference signal. This may also include the transmit power that is used for the UL RS. This may include information regarding the other network nodes and could either be received over the air by all network nodes or forwarded from network node NN1 initiating the measurement to the other participating network nodes, such as network node NN2.

Gain calculation: in this step, network nodes NN1 and NN2 use the results from the measurements and the information provided in the measurement report to calculate the difference in gain G1 and G2. In an optional step 5b network nodes NN1 and NN2 exchange the calculated gains G1 and G2 with each other.

One remaining problem is however that the network node 100 will need to perform the RS measurement every time the user device 300 enters the cell. In some scenarios, the user device 300 may be connected to more than one network node at the same time. It may be desirable for the MCS selection by one network node to know the gain for uplink and downlink in other connected network node, e.g. if a common MCS selection is used in all network nodes.

Even if separate MCS selection is performed in two network nodes, it may also be important to know the difference in gain since this may impact the connection handling decision or whether to transmit data through the different network nodes to the user device. For example, even if the UL measurements indicate an advantageous channel state, but due to a difference in gain, the DL would result in a poor radio connection, this may not be suitable for DL transmission to this user device 300.

Figure 10:
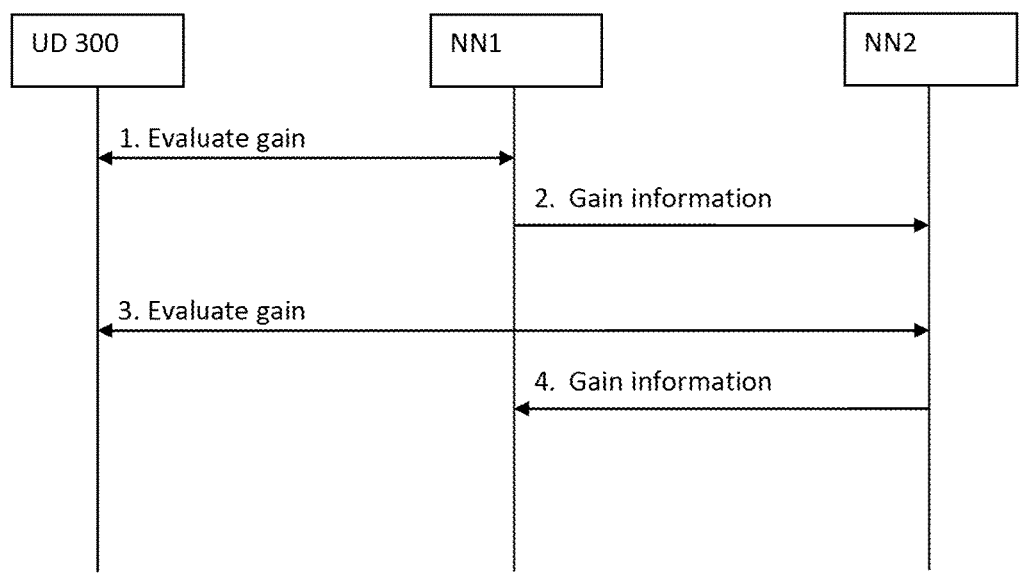

Hence, in another example of the present disclosure the network node 100 exchanges this user device 300 specific information in relation with connection handling for a specific user device 300, e.g. before or after connection handling is executed. In the term connection handling we include all forms of action motivated by the user device 300 moving and therefore requiring actions between two different network nodes, e.g. handover, setting up new user plane, etc. This is depicted in its simplest form in FIG. 9, where the evaluated gain between one network node NN1 and one user device 300 is forwarded from network node NN1 to another network node NN2. Network node NN2 in FIG. 9 can either be another network node or a coordinating network node. The information exchange can also be bidirectional, i.e. network node NN2 can also send gain information to network node NN1, either based on own measurements or reports from other network nodes. Yet another example of this is depicted in FIG. 10, where both network node NN1 and network node NN2 evaluates the gain and forwards this to the other network node, NN2 and NN1 respectively. It should be noted that the information is transferred during connection handling and not during MCS selection. In case the information is transmitted at the same time as the MCS selection, this would introduce additional delay to the scheduling network node 100.

In the discussion so far, is has been assumed the exchange of the total gain (UL/DL) or the difference of the UL/DL gain. This would typically include the gain of the transmitter, channel and receiver. In some cases, the network node 100 may know the gain for the UL and DL direction of the network node equipment (i.e. RB, TB). This could for example be achieved by specific calibration (e.g. before deployment), calibration using specific test user device 300 during operation, or by collecting and average gain during operation from normal user devices. This means that the network node specific gains of RB and TB in FIG. 5 are known in the network node 100. In this case, there is only uncertainty of the user device 300 gain. In this case, it would be possible to only exchange this network node specific gain information between network nodes 100 and thereby reduce the need for the aforementioned gain calculation between each user device 300 and network node. In this example, a network node 100 would exchange the UL/DL gain of the network node part (RB, and TB) to other network nodes, e.g. on a periodic basis, when triggered by a change (when the network node specific gain changes), or triggered by a mobility or connection event.

The receiving network node may then combine the network node specific gain information received from another network node, with its own network node specific gain information to determine the difference in the network node specific gain between the two network nodes. When the user device 300 connects to a new network node 100, or when the connection is handed over to another network node, the network node also signals either the total gain (as described before) or the user device 300 specific UL/DL gain (TM and RM).

Figure 11:
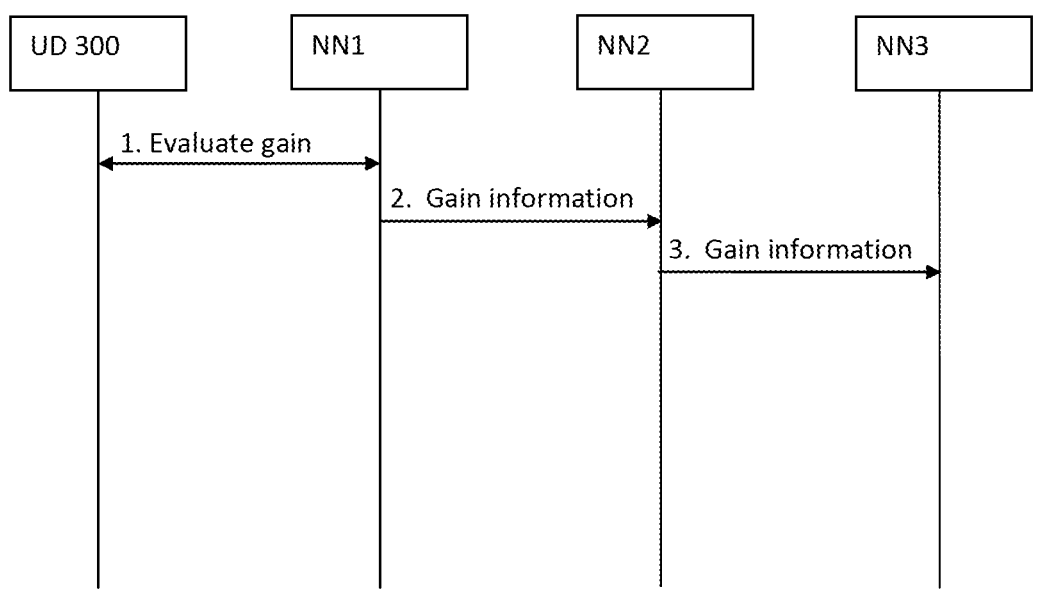

The resulting gain signalling related to user device 300 mobility handling is depicted in the FIG. 11. In FIG. 11, the gain between user device 300 and network node NN1 is calculated in step 1, and passed to network node NN2 in step 2 and then further to network node NN3 in step 3. Since network nodes NN1, NN2, and NN3 already have exchanged the network node specific gain information in a previous step, network node NN2 and network node NN3 can assess the gain difference between the user device 300 and all other network nodes without requiring a separate gain evaluation (similar to step 1) between network node NN2 and network node NN3. As previously mentioned, the information can also be passed to a controlling node, e.g. a controlling node controlling multiple network nodes.

As discussed before, there are advantages to understand the difference between the gain in UL and DL gain when performing MCS. But there are also other issues. One issue is how to take the user device 300 receiver implementation into account. In a scheme for DL MCS selection using UL RS for MCS selection in the network node 100, the network node 100 may not be aware of the performance of the user device 300 receiver, and cannot know exactly which MCS is suitable even if the network node 100 can determine the connection quality as described in pervious examples. Hence, the actual MCS selection based on received Signal to Noise Ratio (SNR) can be corrected both for the gain (as discussed earlier) but also specifics about the user device 300 receiver may be taken into account.

One example A) is to use OLLA as described earlier. With OLLA, the transmitter of the network node 100 will learn the capabilities of the user device 300 based on the outcome of previous transmission (feedback of successful/unsuccessful transmissions). The measured gain difference can be used as a starting point, and OLLA can be applied on top of that. One problem is however that this adjustment with OLLA takes time. The network node 100 will need to collect statistics for a large number of transmissions for some time to determine the performance of the user device 300. One way to reduce the impact is to transfer the information gathered by the OLLA to another network node.

Assuming that the measured SINR is first adjusted with the result from the gain measurement, thereby removing any impact from the gain inaccuracies, the information related to user device receiver sensitivity can be re-used by another network node. This can for example be transmitted as one or more values, describing offset for this specific user device 300 compared to a previously defined table used for MCS, or describing parameters for an algorithm defining how to perform MCS. One example of the mentioned table would be a mapping table from SINR thresholds to MCS. This can be defined in a standard specification or configured by a management system. A simple solution is that only one value is signalled between network nodes, applying to all thresholds in the table. But also multiple values may be signalled, describing an offset to be applied to different SINR threshold for different MCS. This can be forwarded in a similar manner as discussed above.

The forwarding applies for the case where the user device 300 is moving in the cellular network and connection handling is used. One example is if the user device 300 is transmitting periodic UL RS and where the network nodes (network nodes or controllers) detect this UL RS. In this case, the user device 300 will move through the network and the network node either the old or the new network node will detect that the user device has moved from one old network node to a new network node. In this case, the information about the user device 300 can be forwarded in the system, either by the old network node deciding to send this information from the old network node to the new network node or by the new network node requesting this information from the old network node.

Another possibility is to let the user device 300 send information to the network node 100, consisting of one of the solutions mentioned before (e.g. a single offset, or a table of offsets for each MCS, or a set of parameters used in a predefined algorithm to perform MCS). The user device 300 may send a partial of full update of this information to the network node 100. This may be a complementing solution to example A), since this will speed up the initial creation of this table in the network node 100 but where the network node 100 may use the information form the user device 300 as an additional input in the optimisation according to the example described in A) to further refine the MCS.

It may also be especially beneficial in case the user device 300 performance is depending on the radio environment, and where the environment in which the user device 300 operates changes, e.g. the interference or propagation changes. In that case, the user device 300 may be equipped with a receiver with different performance in different interference scenarios, and this solution can be used by the user device 300 to notify the network node of this change scenario and how this may impact the MCS selection. During mobility, this information can be provided by the user device 300 to the new network node 100 but in order to save radio resources, it is beneficial to forward this information from the old network node to the new network node.

Yet another complementing solution to example A) is to re-use the Channel Quality Indicator (CQI) reporting in legacy systems (such as LTE) where the user device 300 reports the suitable MCS to the network node 100. This solution provides a more accurate MCS selection but requires more signalling. But, when combined, this legacy signalling can be made less frequent, and used by the network node 100 to enhance the MCS based on the measurement on the UL RS, thereby to a large extent reduce the need for transmitting information according to the legacy solution. Nota that also for this example, the information (e.g. one or more values, used as offset in an MCS table or as input parameter to a function for MCS selection) about an optimised MCS selection may be forwarded.

Yet another complementing solution to example A) is to include additional information to the ACK/NACK information normally transmitted after receiving information in the user device 300 in order to reduce the time it takes for OLLA to reach an optimum state. Instead of just transmitting 1 bit, this information could be extended to include soft information, e.g. how far from ideal MCS selection the transmission was received (in SNR), a more general value e.g. representing the quality of the channel decoding process (the distance), or an indication how the MCS selection could be modified in steps in the MCS table, e.g. transmit a value in the range [−2, −1, 0, 1, 2]. Note that also for this example, the information (e.g. one or more values, used as offset in an MCS table or as input parameter to a function for MCS selection) about an optimised MCS selection may be forwarded.

Similarly as in the previous section, the user device 300 must also perform MCS selection. This can be performed by the network node 100 based on the measurements on the UL and signalled to the user device 300 as part of the scheduling grant. In this case there is no need to enhance the signalling compared to legacy systems.

But there may be cases where a user device 300 is assigned resources for UL transmission on a regular basis (so called semi persistent scheduling) and where there no specific signalling to assign a scheduling grant prior to each UL transmission. In this case, it may be good to enhance the mechanism to allow for adaptation of the MCS also if no grants are transmitted for every UL transmission.

One example B) is to send the selected MCS from the network node 100 to the user device 300 separately, also in case no grant is transmitted. The MCS can be based on e.g. UL OLLA, but also be based on the calculated difference in gain between the UL and the DL. Similar to example A) it may be beneficial to exchange this information with other network nodes during mobility.

Another possibility is to send an MCS delta to the user device 300, and let the user device 300 combine the information about the MCS delta with the last MCS used in DL when selecting a suitable UL MCS. This however requires that there is DL data transmission. The benefit of this example is that the MCS delta can be more efficiently encoded, since the information included most likely can cover a smaller range, e.g. [−2, −1, 0, 1, 2]. It may also be possible to send this information less frequent, assuming that the same delta value can be used during a longer time. The network node 100 can therefore decide when there is a need to update the MCS selection in the UL by sending the MCS delta value. The calculation of the MCS delta can be based on e.g. UL OLLA, but also be based on the calculated difference in gain between the UL and the DL. Similar to example A) it may be beneficial to exchange this information with other network nodes during mobility.

In most wireless communication systems, the user device 300 can be in different active, idle or detached states. In idle state, the user device 300 may not exchange any data with the radio network but still perform some basic mobility tasks (e.g. cell selection). In a detached state the user device 300 will not communicate with the network nodes.

Therefore according to and an example of the present disclosure the idea is to store all information retrieved by the network node 100, e.g. the information about the calculated gain G and/or information on MCS selection when a user device 300 goes to into an idle or detached state. This can be either be stored in the last serving network node, or in a central node, and later retrieved when the user device 300 returns to the radio network to transmit data (enters an active state) and connecting to the radio network or a different network node. The information may be retrieved by any network node, or only by network nodes from a subset of network nodes, e.g. neighbour network nodes.

Hence, according to a further example of the present disclosure, the processor 102 of the network node 100, when the user device 300 enters idle state or detached state, further is configured to store the calculated gain G or the received power of the second reference signal RS2 in a memory 114 of the network node 100. The processor 102 of the network node 100 may also be configured to retrieve the calculated gain G or the received power of the second reference signal RS2 from the memory 114.

The network node 100 may be a (radio) network node 300 or an access node or an access point or a base station, e.g. a Radio Base Station (RBS), which in some networks may be referred to as transmitter, "eNB", "eNodeB", "NodeB" or "B node", depending on the technology and terminology used. The radio network nodes may be of different classes such as e.g. macro eNodeB, home eNodeB or pico base station, based on transmission power and thereby also cell size. The radio network node can be a Station (STA), which is any device that contains an IEEE 802.11-conformant Media Access Control (MAC) and Physical Layer (PHY) interface to the Wireless Medium (WM).

The user device 300 discussed in the present disclosure may be any of a User Equipment (UE), mobile station (MS), wireless terminal or mobile terminal is enabled to communicate wirelessly in a wireless communication system, sometimes also referred to as a cellular radio system. The UE may further be referred to as mobile telephones, cellular telephones, computer tablets or laptops with wireless capability. The UEs in the present context may be, for example, portable, pocket-storable, hand-held, computer-comprised, or vehicle-mounted mobile devices, enabled to communicate voice or data, via the radio access network, with another entity, such as another receiver or a server. The UE can be a Station (STA), which is any device that contains an IEEE 802.11-conformant Media Access Control (MAC) and Physical Layer (PHY) interface to the Wireless Medium (WM).

An "or" in this description and the corresponding claims is to be understood as a mathematical OR which covers "and" and "or", and is not to be understood as an XOR (exclusive OR).

According to a first aspect of the disclosure, the above mentioned and other objectives are achieved with a network node for a wireless communication system, the network node comprising:

a transceiver configured to transmit a first control signal to a user device, the first control signal comprising a measurement request for at least one first reference signal, transmit the first reference signal to the user device, receive a second control signal from the user device, the second control signal comprising a measurement report indicating a measurement of the first reference signal at the user device, receive a second reference signal from the user device;

a processor configured to measure a received power of the second reference signal, calculate at least one gain between the network node and the user device based on the measurement of the first reference signal and the received power of the second reference signal.

The measurement of the first reference signal reported from the user device to the network node is either the received power of the first reference signal at the user device or the gain for the first reference signal sent from the network node to the user device. When calculating the gain, the user device would could e.g. use information about the transmit power of the first reference signal and the measured received power of the first reference signal at the user device to calculate the gain, e.g. received power divided by the transmitted power.

Furthermore, the first reference signal and the second reference signal may be transmitted within the coherence time of the radio channel between the network node and the user device.

The network node according to the first aspect provides a number of advantages over conventional solutions. Uplink measurements are used for knowing the gain of the uplink channel. But the gain in the involved network nodes and user device may be different in the uplink and the downlink. By knowing the difference in gain, the network node can use uplink measurements to also understand the gain in the downlink channel. The benefit of having the present combined uplink and downlink measurement is that the difference in gain can be measured to reduce the impact of different gain in the involved network nodes and user device, and enable the use of measurements in one direction which will reduce the need to feedback the measurement results, and reduce the need to send the reference signal in both directions. Therefore, improved calculated gain is provided. Thereby, improved transmissions are possible e.g. by better MCS selection and improved connection handling decisions.

In a first possible implementation form of a network node according to the first aspect, the calculated gain is at least one of a gain from the network node to the use device and a gain from the user device to the network node.

An advantage with the first possible implementation form is that by knowing the gain for both uplink and downlink is that this calculated gain contains more information (not only the difference) which is beneficial for example when exchanging the calculated gain with other network nodes.

In a second possible implementation form of a network node according to the first possible implementation form of the first aspect or to the first aspect as such, the calculated gain is a gain difference between a gain from the network node to the use device and a gain from the user device to the network node.

An advantage with the second possible implementation form is that by using only the gain difference the information that need to be transmitted can be reduced. This means reduced overhead, e.g. it is possible to transmit the result from the measurement as a single value with smaller value range corresponding to the accuracy requirement, e.g. from −6 dB to 6 dB, instead of having to cover the range of the received power which may be much larger.

In a third possible implementation form of a network node according to the first or second possible implementation forms of the first aspect or to the first aspect as such, the transceiver further is configured to forward the calculated gain or the measured received power of the second reference signal to at least one another network node.

It is also beneficial for one network node (NN1) to know the gain between the user device and another network node (NN2). With this information, network node NN1 is able to not only base connection handling decisions on the measured channel quality in the uplink received from network node NN2, but by using the gain information from network node NN2, network node NN1 can also understand the channel quality in the downlink. Therefore, network node NN1 can perform better connection handling decisions, when understanding the quality in both the uplink and the downlink.

Depending on the system architecture, one network node (NN1) may also be responsible for deciding which data to be transmitted through another network node (NN2) and may even be in charge of selecting the MCS to be used in network node NN2. In this case, it would be beneficial for network node NN1 to know the measured channel quality in the uplink and the gain information from network node NN2, so that network node NN1 can also understand the channel quality in the downlink in network node NN2. Therefore, network node NN1 can perform better decisions, when understanding the quality in both the uplink and the downlink.

In a fourth possible implementation form of a network node according to the third possible implementation form of the first aspect, the calculated gain or the measured received power of the second reference signal is forwarded in connection with connection handling for the user device or when the user device enters idle state or detached state.

With connection handling we mean actions related to managing the connection(s) between the user device and one or more network nodes, including such functionality as hard handover, soft handover, addition and release of user plane connections (also known as dual connectivity or multi stream aggregation). This should for example include all actions related to a user device moving in the system.

An advantage with the fourth possible implementation form is to only exchange the calculated gain when needed, e.g. when connection handling is needed or when the user device enters idle mode.

If the user device enters an idle state, the network node can store this information or forward this information to another network node which can store the information. Later, if the user device enters active mode again, the network node handling the user device may retrieve or request another node to retrieve and send any stored previous information. The benefit of this is to reduce the need of the measurement in the network node of the first aspect, since measurements from a previous active session can be reused. The benefit is also that the information can be stored in network node designed to store the information in a more efficient manner, and that the information from connections between one user device and more than one network node can be stored in the same network node, thereby making the retrieval of the information easier when the user device returns from idle mode.

In a fifth possible implementation form of a network node according to any of the preceding possible implementation forms of the first aspect or to the first aspect as such, the transceiver further is configured to receive another calculated gain between another network node and the user device or another received power of the second reference signal.

It is also beneficial for one network node (NN1) to know the gain between the user device and another network node (NN2). With this information, network node NN1 is able to not only base connection handling decisions on the measured channel quality in the uplink received from network node NN2, but by using the gain information from network node NN2, network node NN1 can also understand the channel quality in the downlink. Therefore, network node NN1 can perform better connection handling decisions, when understanding the quality in both the uplink and the downlink.

Depending on the system architecture, one network node (NN1) may also be responsible for deciding which data to be transmitted through another network node (NN2) and may even be in charge of selecting the MCS to be used in network node NN2. In this case, it would be beneficial for network node NN1 to know the measured channel quality in the uplink and the gain information from network node NN2, so that network node NN1 can also understand the channel quality in the downlink in network node NN2. Therefore, network node NN1 can perform better decisions, when understanding the quality in both the uplink and the downlink.

A further advantage with the fifth possible implementation form is to only exchange the calculated gain when needed, e.g. when connection handling is needed or when the user device enters idle mode.

If the user device enters an idle state, the network node can forward this information to another network node which can store the information. Later, if the user device enters active mode again, the network node handling the user device may request any stored previous information. The benefit of this is to reduce the need of the measurement in the network node of the first aspect, since measurements from a previous active session can be reused. The benefit is also that the information can be stored in network node designed to store the information in a more efficient manner, and that the information from connections between one user device and more than one network node can be stored in the same network node, thereby making the retrieval of the information easier when the user device returns from idle mode.

If the network node is further able to isolate the network node specific part of the gain, and exchange this information with other network nodes (e.g. between network nodes NN1 and NN2), this information together with exchanged gain information, can be used in the receiving network node, network node NN2, to calculate the gain between network node NN2 and user device without the need for a measurement between network node NN2 and user device. This is calculated in network node NN2 by comparing the difference in network node specific gain in network node NN1 and network node NN2, and combining this with the reported gain from network node NN1. The benefit of this is to reduce the required number of gain evaluations in the user device. Even though this method may reduce the measurements, it will not completely remove the need for these gain evaluations. This advantage is applicable to all possible implementation forms in which another calculated gain between another network node and the user device or another received power of the second reference signal is received.

In a sixth possible implementation form of a network node according the fifth possible implementation form of the first aspect, the processor further is configured to determine a Modulation and Coding Scheme, MCS, for the user device based on at least one of the calculated gain or the another calculated gain.

The determined MCS can be used for the uplink and/or the downlink depending on the application.

An advantage with the sixth possible implementation form by using the calculated gain or the another calculated gain improved MCS selection can be made.

In a seventh possible implementation form of a network node according any of the preceding possible implementation forms of the first aspect or to the first aspect as such, the processor, when the user device enters idle state or detached state, further is configured to store the calculated gain or the received power of the second reference signal in a memory; or retrieve the calculated gain or the received power of the second reference signal from the memory.

An advantage with the seventh possible implementation form is that this can also be forwarded to another network node (a network node that may designed to store the information in a more efficient manner) in case the user device enters an idle state so that the network node can request this information from the other network node later. The benefit of this is to reduce the need of measurements according to the measurement in the network node of the first aspect. The benefit is also that the network node does not have to store the calculated gain, and that the another network node may also collect this information from multiple network nodes and send to one or more network nodes when the user device returns from idle mode.

In an eight possible implementation form of a network node according any of the preceding possible implementation forms of the first aspect or to the first aspect as such, the measurement request further indicates a transmitted power of the first reference signal.

An advantage with the eight possible implementation form is that the transmit power does not need to be common for all user devices served by the network node, but can be different per user device.

In a ninth possible implementation form of a network node according any of the preceding possible implementation forms of the first aspect or to the first aspect as such, the measurement request further indicates resource allocation for the first reference signal or the second reference signal.

An advantage with the ninth possible implementation form is that the network node can allocate the resources in a dedicated way per user device, i.e. not common for all user devices served by the same network node.

According to a second aspect of the disclosure, the above mentioned and other objectives are achieved with a user device for a wireless communication system, the user device comprising:

a transceiver configured to receive a first control signal from a network node, the first control signal comprising a measurement request for a first reference signal, receive the first reference signal from the network node, a processor configured to measure the first reference signal according to the measurement request, wherein the transceiver further is configured to transmit a second control signal to the network node, the second control signal comprising a measurement report indicating the measurement of the first reference signal, transmit a second reference signal to the network node.

The measurement of the first reference signal reported from the user device to the network node is either the received power of the first reference signal at the user device or the gain for the first reference signal sent from the network node to the user device. When calculating the gain, the user device would could e.g. use information about the transmit power for the first reference signal and the measured received power of the first reference signal at the user device to calculate the gain, e.g. received power divided by the transmitted power.

The user device according to the second aspect provides a number of advantages over conventional solutions. Uplink measurements are used for knowing the gain of the uplink channel. But the gain in the involved network node(s) and user device may be different in the uplink and the downlink. By knowing the difference in gain, the network node can use uplink measurements to also understand the gain in the downlink channel. The benefit of having the present combined uplink and downlink measurement is that the difference in gain can be measured to reduce the impact of different gain in the involved network nodes and user device, and enable the use of measurements in one direction which will reduce the need to feedback the measurement results, and reduce the need to send the reference signal in both directions. Therefore, improved calculated gain is provided. Thereby, improved transmissions are possible e.g. by better MCS selection and improved connection handling decisions.

In a first possible implementation form of a user device according to the second aspect, the measurement report further indicates a transmitted power of the second reference signal.

An advantage with the first possible implementation form is that the user device may select the output power by itself, e.g. reduced for user device that are close to the network node.

According to a third aspect of the disclosure, the above mentioned and other objectives are achieved with a wireless communication system comprising at least one network node according to the first aspect and at least one user device according to the second aspect.

According to a fourth aspect of the disclosure, the above mentioned and other objectives are achieved with a method for a wireless communication system, the method comprising:

transmitting a first control signal to a user device, the first control signal comprising a measurement request for at least one first reference signal, transmitting the first reference signal to the user device, receiving a second control signal from the user device, the second control signal comprising a measurement report indicating a measurement of the first reference signal at the user device, receiving a second reference signal from the user device;

measuring a received power of the second reference signal, calculating at least one gain between the network node and the user device based on the measurement of the first reference signal and the received power of the second reference signal.

In a first possible implementation form of a method according to the fourth aspect, the calculated gain is at least one of a gain from the network node to the use device and a gain from the user device to the network node.

In a second possible implementation form of a method according to the first possible implementation form of the fourth aspect or to the fourth aspect as such, the calculated gain is a gain difference between a gain from the network node to the use device and a gain from the user device to the network node.

In a third possible implementation form of a method according to the first or second possible implementation forms of the fourth aspect or to the fourth aspect as such, the method further comprises forwarding the calculated gain or the measured received power of the second reference signal to at least one another network node.

In a fourth possible implementation form of a method according to the third possible implementation form of the fourth aspect, the calculated gain or the measured received power of the second reference signal is forwarded in connection with connection handling for the user device or when the user device enters idle state or detached state.

In a fourth possible implementation form of a method according to any of the preceding possible implementation forms of the fourth aspect or to the fourth aspect as such, the method further comprises receiving another calculated gain between another network node and the user device or another received power of the second reference signal.

In a fifth possible implementation form of a method according the fourth possible implementation form of the fourth aspect, the method further comprises determining a Modulation and Coding Scheme, MCS, for the user device based on at least one of the calculated gain or the another calculated gain.

In a sixth possible implementation form of a method according any of the preceding possible implementation forms of the fourth aspect or to the fourth aspect as such, the method further comprises, when the user device enters idle state or detached state, storing the calculated gain or the received power of the second reference signal in a memory; or retrieving the calculated gain or the received power of the second reference signal from the memory.

In a seventh possible implementation form of a method according any of the preceding possible implementation forms of the fourth aspect or to the fourth aspect as such, the measurement request further indicates a transmitted power of the first reference signal.

In an eight possible implementation form of a method according any of the preceding possible implementation forms of the fourth aspect or to the fourth aspect as such, the measurement request further indicates resource allocation for the first reference signal or the second reference signal.

According to a fifth aspect of the disclosure, the above mentioned and other objectives are achieved with a method for a wireless communication system, the method comprising:

receiving a first control signal from a network node, the first control signal comprising a measurement request for a first reference signal, receiving the first reference signal from the network node, measuring the first reference signal according to the measurement request, transmitting a second control signal to the network node, the second control signal comprising a measurement report indicating the measurement of the first reference signal, transmitting a second reference signal to the network node.

In a first possible implementation form of a user device according to the second aspect, the measurement report further indicates a transmitted power of the second reference signal.

The advantages of the methods according to the fourth or the fifth aspects are the same as those for the network node and the user device according to the first and second aspects.

The present disclosure also relates to a computer program, characterized in code means, which when run by processing means causes said processing means to execute any method according to the present disclosure. Further, the disclosure also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Furthermore, any method according to the present disclosure may be implemented in a computer program, having code means, which when run by processing means causes the processing means to execute the steps of the method. The computer program is included in a computer readable medium of a computer program product. The computer readable medium may comprises of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that the present first network node and second network node comprises the necessary communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the present solution.

Especially, the processors of the present devices may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the present disclosure is not limited to the examples described above, but also relates to and incorporates all examples within the scope of the appended independent claims.

The invention claimed is:

1. A network node for a wireless communication system, comprising:
   a transceiver configured to:
      transmit a first control signal to a user device, the first control signal comprising a measurement request for at least one first reference signal;
      transmit the at least one first reference signal to the user device;
      receive a second control signal from the user device, the second control signal comprising a measurement report indicating a measurement of the at least one first reference signal at the user device; and
      receive a second reference signal from the user device; and
   a processor configured to:
      measure a received power of the second reference signal;
      calculate at least one gain between the network node and the user device based on the measurement of the at least one first reference signal and the received power of the second reference signal; and
      when the user device enters an idle state or a detached state, store the at least one calculated gain or the received power of the second reference signal in a memory, or retrieve the at least one calculated gain or the received power of the second reference signal from the memory.

2. The network node according to claim 1, wherein the at least one calculated gain comprises at least one of: a gain from the network node to the user device, or a gain from the user device to the network node.

3. The network node according to claim 1, wherein the at least one calculated gain comprises a gain difference between a gain from the network node to the user device and a gain from the user device to the network node.

4. The network node according to claim 1, wherein the transceiver is further configured to forward the at least one calculated gain or the received power of the second reference signal to at least one other network node.

5. The network node according to claim 4, wherein the at least one calculated gain or the received power of the second reference signal is forwarded in connection with connection handling for the user device.

6. The network node according to claim 4, wherein the at least one calculated gain or the received power of the second reference signal is forwarded when the user device enters the idle state or the detached state.

7. The network node according to claim 1, wherein the transceiver is further configured to receive another calculated gain between another network node and the user device or another received power of the second reference signal.

8. The network node according to claim 1, wherein the measurement request further indicates a transmitted power of the at least one first reference signal.

9. The network node according to claim 1, wherein the measurement request further indicates resource allocation for the at least one first reference signal or the second reference signal.

10. A device for a wireless communication system, comprising:
   a transceiver configured to:
      receive a first control signal from a network node, the first control signal comprising a measurement request for a first reference signal; and
      receive the first reference signal from the network node; and
   a processor configured to measure the first reference signal according to the measurement request;
   wherein the transceiver further is configured to transmit a second control signal to the network node, the second control signal comprising a measurement report indicating the measurement of the first reference signal, and to transmit a second reference signal to the network node, wherein the measurement report indicates a transmitted power of the second reference signal, to facilitate the network node calculating at least one gain between the network node and the device based on the measurement of the first reference signal and a received power of the second reference signal;

wherein the processor is further configured to cause the device to enter an idle state or a detached state, wherein the device entering the idle state or the detached state facilitates the network node forwarding the at least one calculated gain or the received power of the second reference signal to at least one other network node when the device enters the idle state or the detached state.

11. A method for a wireless communication system, comprising:

transmitting, by a network device, a first control signal to a user device, the first control signal comprising a measurement request for at least one first reference signal;

transmitting, by the network device, the at least one first reference signal to the user device;

receiving, by the network device, a second control signal from the user device, the second control signal comprising a measurement report indicating a measurement of the at least one first reference signal at the user device;

receiving, by the network device, a second reference signal from the user device;

measuring, by the network device, a received power of the second reference signal;

calculating, by the network device, at least one gain between the network device and the user device based on the measurement of the at least one first reference signal and the received power of the second reference signal; and when the user device enters an idle state or a detached state, storing, by the network device, the at least one calculated gain or the received power of the second reference signal in a memory, or retrieving the at least one calculated gain or the received power of the second reference signal from the memory.

12. The method according to claim 11, wherein the at least one calculated gain comprises at least one of: a gain from the network device to the user device, a gain from the user device to the network device.

13. The method according to claim 11, wherein the at least one calculated gain comprises a gain difference between a gain from the network device to the user device and a gain from the user device to the network device.

14. The method according to claim 11, further comprising:

forwarding the at least one calculated gain or the received power of the second reference signal to at least one other network node.

15. The method according to claim 14, wherein the at least one calculated gain or the received power of the second reference signal is forwarded in connection with connection handling for the user device.

16. The method according to claim 14, wherein the calculated gain or the received power of the second reference signal is forwarded when the user device enters an idle state or a detached state.

17. The method according to claim 11, further comprising:

receiving another calculated gain between another network node and the user device or another received power of the second reference signal.

18. A method for a wireless communication system, comprising:

receiving, by a user device, a first control signal from a network node, the first control signal comprising a measurement request for a first reference signal;

receiving, by the user device, the first reference signal from the network node;

measuring, by the user device, the first reference signal according to the measurement request;

transmitting, by the user device, a second control signal to the network node, the second control signal comprising a measurement report indicating the measurement of the first reference signal, and transmitting, by the user device, a second reference signal to the network node, wherein the measurement report indicates a transmitted power of the second reference signal, to facilitate the network node calculating at least one gain between the network node and the user device based on the measurement of the first reference signal and a received power of the second reference signal; and entering, by the user device, an idle state or a detached state, wherein the network node forwards the at least one calculated gain or the received power of the second reference signal to at least one other network node when the user device enters the idle state or the detached state.

* * * * *